United States Patent [19]
Stickler et al.

[11] Patent Number: 5,857,836
[45] Date of Patent: *Jan. 12, 1999

[54] EVAPORATIVELY COOLED ROTOR FOR A GAS TURBINE ENGINE

[75] Inventors: David B. Stickler, Carlisle; Jack L. Kerrebrock, Lincoln, both of Mass.

[73] Assignee: Aerodyne Research, Inc., Billerica, Mass.

[*] Notice: This patent issued on a continued prosecution application filed under 37 CFR 1.53(d), and is subject to the twenty year patent term provisions of 35 U.S.C. 154(a)(2).

[21] Appl. No.: 711,817

[22] Filed: Sep. 10, 1996

[51] Int. Cl.$^6$ ....................................................... B63H 1/14
[52] U.S. Cl. .......................................... 416/96 R; 416/968
[58] Field of Search .......................... 415/114; 416/96 R, 416/96 A; 60/39.75

[56] References Cited

U.S. PATENT DOCUMENTS

| | | |
|---|---|---|
| 2,708,564 | 5/1955 | Erickson . |
| 2,744,723 | 5/1956 | Roush .................................... 416/96 R |
| 3,738,771 | 6/1973 | Delarbre et al. ...................... 416/96 R |
| 4,111,604 | 9/1978 | Kydd . |
| 4,179,240 | 12/1979 | Kothmann . |
| 4,302,153 | 11/1981 | Tubbs . |
| 4,330,235 | 5/1982 | Araki . |
| 4,512,715 | 4/1985 | Cohn et al. . |
| 4,845,941 | 7/1989 | Paul . |
| 5,003,766 | 4/1991 | Paul . |
| 5,125,793 | 6/1992 | MacArthur et al. . |
| 5,177,954 | 1/1993 | Paul . |
| 5,299,418 | 4/1994 | Kerrebrock ............................. 60/39.75 |
| 5,318,404 | 6/1994 | Carreno et al. ....................... 416/96 R |
| 5,341,636 | 8/1994 | Paul . |
| 5,403,157 | 4/1995 | Moore .................................... 415/115 |
| 5,601,399 | 2/1997 | Okpara et al. ......................... 415/115 |

FOREIGN PATENT DOCUMENTS

| | | |
|---|---|---|
| 2098558 | 3/1972 | France . |
| 2826998C | 6/1995 | Germany . |
| 59-218303 | 12/1984 | Japan . |
| 2051254 | 1/1981 | United Kingdom . |
| 2245660 | 1/1992 | United Kingdom . |

*Primary Examiner*—Thomas E. Denion
*Attorney, Agent, or Firm*—Cesari and McKenna, LLP

[57] ABSTRACT

An evaporatively cooled rotor for a gas turbine engine. Each rotor defines an internal cavity which includes a vaporization section that corresponds generally to the blade section of the rotor and a condensing section that corresponds generally to the hub section of the rotor. A radial array of circumferentially disposed capture shelves is provided in the vaporization section for capturing cooling fluid contained within the internal cavity and flowing radially outward under the centrifugal field generated during rotation of the rotor. A barrier disposed along the inner surface of the rotor wall in the condensing section slows or temporarily stops the flow of cooling fluid prior to reaching the vaporization section and a perforated baffle attached to the capture shelves prevents cooling fluid from splashing out of the shelves.

28 Claims, 10 Drawing Sheets

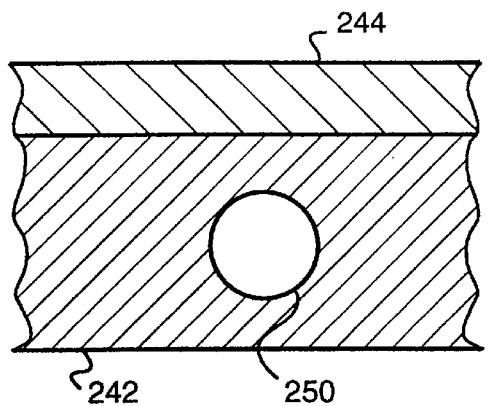
FIG. 5A
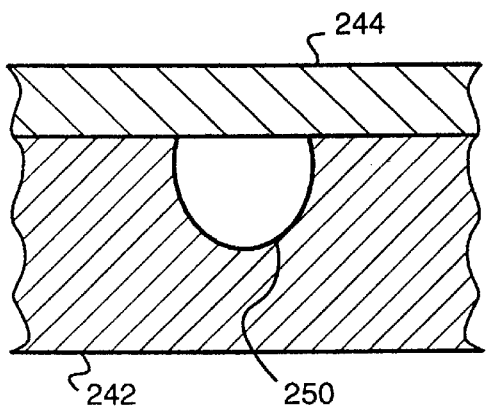 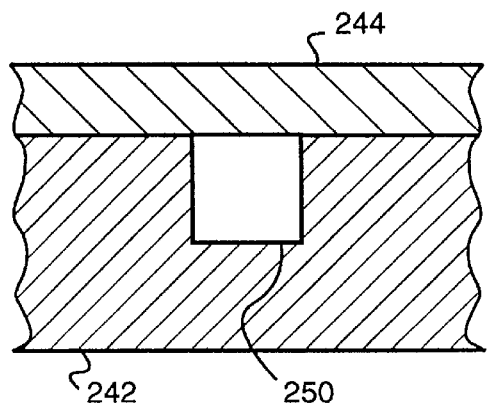
FIG. 5B     FIG. 5C
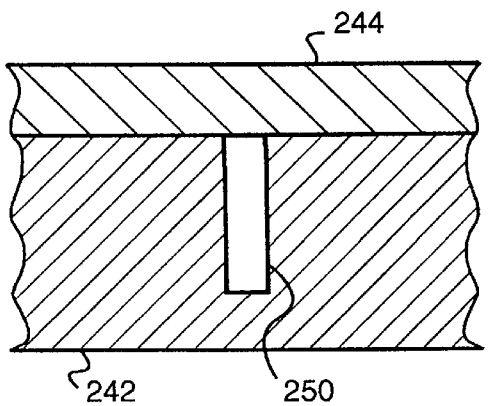 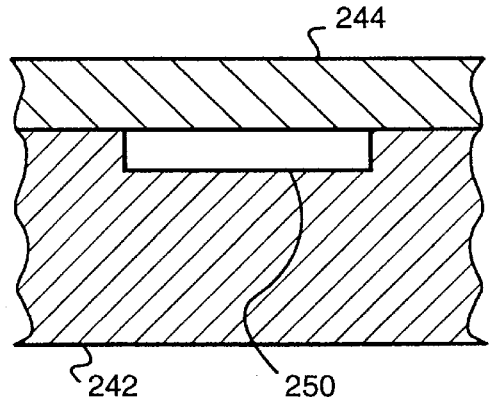
FIG. 5D     FIG. 5E

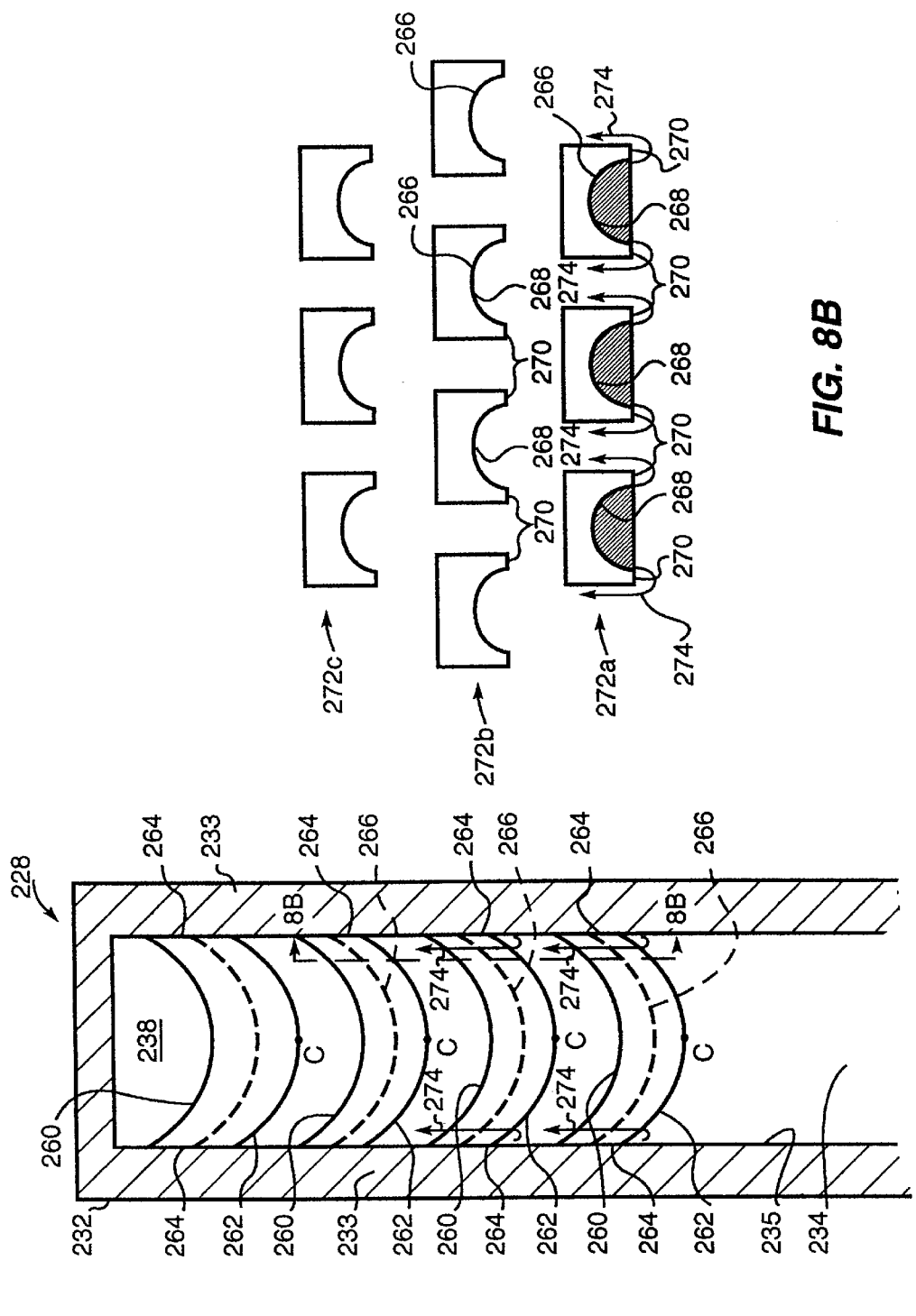

EVAPORATIVELY COOLED ROTOR FOR A GAS TURBINE ENGINE

This invention was made with Government support under Contract Number F33615-96-C-2617 awarded by the United States Air Force. The Government has certain rights in the invention.

FIELD OF THE INVENTION

The present invention relates generally to gas turbine engines and, more specifically, to an improved evaporatively cooled rotor for a gas turbine engine.

BACKGROUND OF THE INVENTION

Gas turbine engines, which are used to power aircraft, ships and other vehicles, and to provide shaft power in stationary installations, typically include a compressor section, a combustion chamber and a turbine section. Depending on the particular application, additional flow components including an intake diffuser, power turbine and a nozzle may also be incorporated.

During operation of the engine, air is ingested by the compressor section, which typically includes alternating rows of rotating and stationary blades. After the compressed air exits the compressor, it is typically decelerated for pressure recovery and distributed to one or more combustion chambers. There fuel is injected into the air and the air/fuel mixture is burned at approximately constant pressure.. After combustion, the hot combustion gases are expanded through the turbine section, which typically includes an entry nozzle followed by one or more series of rotating and stationary blade rows for extraction of mechanical work from the expansion of the hot gases. The extracted work is used to rotate a shaft which, in turn, drives the rotating blades of the compressor.

In a basic aircraft propulsion application, the hot gases are then further expanded and discharged through a nozzle at a high velocity, providing substantial thrust to the engine. In addition to turning the compressor blades, the turbine section may include a power section to drive other devices, such as a fan as in a turbofan engine, a propeller as in a turboshaft engine or an electrical generator as in a stationary power system.

The optimal thermodynamic temperature for combustion in a gas turbine engine corresponds approximately to a stoichiometric fuel/air ratio which would result in combustion gas temperatures on the order of 4000° Fahrenheit or higher. Conventional gas turbines, however, typically operate at a much lower turbine inlet temperature, ranging from about 2200° to 3000° Fahrenheit, depending on the specific application of the engine. This limitation in operating temperature is due primarily to the lack of materials for use in the turbine section that are capable of withstanding the high temperatures of stoichiometric or near stoichiometric combustion in addition to the tremendous stresses resulting from the high rotational speeds of the turbine section and the harsh oxidizing environment imposed by the combustion products. As a result, conventional gas turbines often employ expensive high temperature superalloys in the turbine sections and yet still operate at relatively low power per unit of airflow and low fuel efficiencies when compared to the results that could be achieved at higher levels of fuel/air stoichiometry.

Similarly, the development of advanced turbine engines operating at higher pressure ratios results in air temperatures in the high pressure stages of the compressor that may exceed allowable limits for desirable structural materials. Consequently, such engine designs may require the use of active cooling or expensive superalloys in portions of the compressor section as well.

In an effort to overcome these limitations, substantial efforts have been directed primarily to cooling parts of the turbine section to a temperature substantially below that of the hot combustion gases. Most gas turbine engines, for example, divert a flow of "cool" bleed air from the compressor (bypassing the combustor) to hollow turbine blades. The turbine blades further include a series of pin holes along the blade surface to permit the "cool" bleed air from the blade interior to flow onto the blade surface thereby providing a thin film of cool air over the blade's external surface. This flow of bleed air then mixes with the expansion flow of hot combustion gases in the turbine section and is discharged through the nozzle of the engine. This type of blade cooling typically lowers the temperature of the turbine blades to approximately 1800° Fahrenheit or less at the conventional operating temperatures noted above.

This approach, however, has many drawbacks. First, the drawing off of bleed air lowers the operating efficiency of the engine. Specifically, since the bleed air used to cool the turbine blades was not burned during the combustion process, it provides much less expansion work in the turbine section than the main combustion gas flow. Nonetheless, the turbine expended work compressing this air. Consequently, an optimum allowable quantity of bleed air is defined by balancing the reduction in the level of expansion work performed in the turbine section with the benefit of higher combustion gas temperature. In addition this approach is typically unable to lower blade temperatures to the point where expensive superalloy materials in the turbine section are no longer necessary.

Other design approaches considered or under development include various forms of forced liquid or gas flow through the turbine blades from an external source. Both closed and open flow paths within the turbine blades have been explored, including water circulation and steam throughflow, similar to cooling with compressor bleed air. These approaches, however, are not attractive for flight vehicles because of the added mass of the coolant. They also introduce added complexity to the engine by requiring coolant delivery from a stationary supply to the rotating components, making them undesirable for stationary or surface vehicle systems as well.

Cooling by fuel circulation through the turbine blades prior to its combustion is also under development. In these designs, heat is absorbed by the fuel as a simple thermal mass, through controlled endothermic decomposition, or by reforming, e.g., of methane with steam. Nonetheless, all of these options require fluid delivery to and removal from the rotating components, as well as specialized fuels, catalysts or thermal conditions.

Another system used to cool turbine blades, which is depicted in FIG. 1 and disclosed in U.S. Pat. No. 5,299,418, the entire disclosure of which is incorporated herein by reference, includes the use of a cooling fluid F disposed within a sealed, internal cavity 34 in each turbine rotor 18. The rotor 18 includes a hub or disc section 28 proximate to the axis of rotation A—A of the engine and a blade section 30 extending outwardly from and supported by the hub 28. The hot combustion gases typically flow past the blade section 30. The rotor 18 further includes a wall 32 which defines the cavity 34. The cavity 34, moreover, is divided into a condensing section 36 located at the hub 28 and a vaporization section 38 located out at the blade 30.

The cooling fluid F cools that portion of the rotor wall 32 in the blade section 30 through evaporation. The physical properties of the cooling fluid F are such that it vaporizes at a temperature suitable for the wall 32 to operate with the hot combustion gases expanding past the rotor 18.

More specifically, rotation of the rotor 18 generates a centrifugal field which causes the cooling fluid F, in liquid form, to flow in the direction of arrows 40. The rotor 18 includes a series of radially spaced capture shelves 46 disposed along the inner surface of the wall 32 in the vaporization section 38. Each capture shelf 46 includes a well 50 facing the axis of rotation A—A. The cooling fluid F flows along the inner surface of the wall 32 from the condensing section 36 toward the vaporization section 38 where it enters the well 50 of the first capture shelf 46.

Ideally, as more cooling fluid F enters the first capture shelf 46, the level of cooling fluid F in that shelf 46 rises until the level of cooling fluid F reaches an inner lip 48 of the cooling shelf 46. The cooling fluid F then begins to cascade over the lip 48 of the first capture shelf 46 into the well 50 of the second capture shelf 46 and so on until each capture shelf 46 theoretically contains a stable pool of cooling fluid F.

Due to the heat flux from the hot combustion gases flowing past the rotor wall 32, a portion of cooling fluid F in each capture shelf 46 evaporates, thereby removing heat from that portion of the rotor wall 32 adjacent to the particular capture shelf 46. As more cooling fluid F evaporates, the localized vapor pressure in the vaporization section 38 increases relative to the vapor pressure in the condensing section 36. This differential in vapor pressure causes the evaporated cooling fluid in the vaporization section 38 to be pumped radially inward against the centrifugal field into the condensing section 36 as shown by arrows 42. The vapor flows to the cooler inner surfaces of the wall 32 in the condensing section 36 where it condenses back into cooling fluid F, thus maintaining a continuous, self-regulating recirculating flow of liquid coolant to the hot blade structure and of vapor to the condensing section 36. Heat rejected by evaporated cooling fluid as it reliquifies in the condensing section 36 may be removed by a number of conventional methods.

By providing a sufficient number of appropriately spaced capture shelves 46 and a sufficient volume of cooling fluid F, it was anticipated that this design would result in a rotor 18 capable of withstanding the higher temperatures associated with more efficient gas turbine operation. However, analytical studies, which were subsequently confirmed through experimentation, have identified limitations based on the internal geometry disclosed in that patent. First, the cooling fluid F traveling along the inner, planar surface of the wall 32 of the condensing section 36, as shown by arrows 40, is rapidly accelerated due to the high rotational speed of the turbine. Thus, by the time the cooling fluid F reaches the first capture shelf 46, the cooling fluid F may be moving at a substantial velocity. Indeed, the velocity of the fluid F is so great that the fluid F is actually turned by and expelled from the first capture shelf 46, rather than being captured therein as a stable pool. Consequently, there may be insufficient cooling fluid F available in the first capture shelf 46 to evaporatively cool the corresponding portion of the rotor wall 32.

In addition, since the cooling fluid F may fail to collect in the first capture shelf 46, there may be little or no cascading of cooling fluid F from one capture shelf 46 to the next. Instead, the majority of cooling fluid F, having been expelled from the first shelf 46 toward the center of the rotor cavity 34, may disperse in an uncontrolled manner and collect at the tip of the rotor 18. Moreover, any cooling fluid F that cascades from one capture shelf 46 to a subsequent capture shelf 46 also may be rapidly accelerated as it flows radially outward under the centrigal field toward the subsequent capture shelf 46. As a result, this fluid F similarly may be expelled from the subsequent shelves 46 resulting in poor coolant distribution throughout the rotor 18.

The fluid F may also become separated from the rotor wall 32 thereby further disrupting the desired flow from one capture shelf 46 to the next. For example, a portion of fluid F flowing over the lip 48 of a capture shelf 46 may separate from the rotor wall due to the abrupt change in flow direction. Since it is the fluid's contact with the rotor wall 32 that imparts rotational acceleration to the fluid F, such separation also reduces the radial acceleration of the fluid F and results in an undefined direction of flow. In addition, since the rotors 18 are typically mounted within the turbine section at a high angle of attack relative to the plane of rotation, coriolis forces acting on the fluid F during rotation of the rotor 18 cause additional separation of the cooling fluid F from the rotor wall 32. In particular, coriolis forces, which act normal to both the axis of rotation and the direction of apparent motion, may force the fluid F circumferentially away from the rotor wall 32. Without a stable pool of cooling fluid F in each capture shelf 46, the system's ability to extract a sufficient quantity of heat from the rotor wall 32 or to provide uniform cooling over the blade section 30 is reduced.

SUMMARY OF THE INVENTION

It is an object of the present invention to improve upon the abovereferenced rotor design.

It is a further object of the invention to improve upon the flow of cooling fluid so that cooling fluid is collected in a stable pool in the first capture shelf of the rotor.

It is a still further object of the invention to improve upon the flow of cooling fluid from one capture shelf to the next so that each capture shelf contains a stable pool of cooling fluid for evaporative cooling of the entire rotor.

Briefly, the invention comprises a rotor having a wall that defines a sealed, inner cavity. A cooling fluid is disposed within the inner cavity. In accordance with the known system, the cavity is divided into a condensing section and a vaporization section. In addition, a series of capture shelves are located along the wall in the vaporization section. Unlike the prior art system, however, the invention further includes, in a first aspect, at least one barrier located on the inner surface of the wall in the condensing section. The barrier is located across the flowpath of the cooling fluid as it flows radially outward under the centrifugal field. The barrier provides an obstruction to the flow of cooling fluid, forcing the fluid to either flow over or through the barrier, thereby decelerating and/or temporarily stopping the flow. By decelerating the flow or creating one or more near-stagnant pool regions, the barrier substantially reduces the velocity of the cooling fluid as it enters the first capture shelf.

In a second aspect, the invention includes a baffle disposed within the cavity and extending radially proximate to the lips of the cooling shelves in the vaporization section. The baffle, which acts as a splash guard, prevents the cooling fluid from being expelled toward the center of the cavity and instead directs the fluid back into the shelves where it forms stable pools. The baffle is preferably porous or perforated so that vapor from the evaporating cooling fluid is free to pass through the baffle and flow to the condensing section.

Because the baffle may prevent the cooling fluid from cascading over the lips of the capture shelves and thereby flowing from one shelf to the next, the lip of each shelf preferably includes at least one passageway or channel providing fluid communication between adjacent shelves. When the level of cooling fluid in a given capture shelf rises above the inlet of the corresponding channel, the cooling fluid enters the channel and flows into the next capture shelf. Since the baffle preferably extends along the lip of each capture shelf, the baffle blocks the fluid from being splashed out of the subsequent capture shelves after traveling through the channels or passageways. It also prevents separation of the cooling liquid from the rotor wall and opposes the coriolis forces otherwise tending to disrupt the flow. The baffle thus permits cooling fluid to be collected as a stable pool in each shelf.

In an alternative embodiment, the invention includes a radial array of bridges disposed within the cavity and extending circumferentially between opposing sides of the rotor. The bridges are preferably arched such that a center portion of each bridge is closer to the rotor axis than the ends of the bridge which are in contact with opposing sides of the rotor. A capture groove is preferably formed along the inner face of each bridge for capturing cooling fluid as it flows radially outward. Since the bridges are arched, the cooling fluid collects within that portion of the capture grooves closest to the sides of the rotor during rotation. The radial array of bridges, moreover, are preferably off set from each other such that the excess cooling fluid flowing over the edges of one capture groove is caught within the capture groove of the subsequent bridge. In the vaporization section these bridges provide controlled liquid flow and distribution for uniform wall cooling independent of coriolis acceleration effects and because they bridge the entire gap between blade walls, they also effectively capture liquid coolant splashed from preceding bridges, preventing its loss to the rotor tip.

In a second alternative embodiment, the lips of the capture shelves rather than having a straight or near straight edge, have an edge whose contour varies in a radial direction. That is, the lips include at least one shallower region which defines an overflow path for the liquid coolant as it cascades from one capture shelf to the next. The lip edge of the subsequent capture shelf, moreover, preferably includes a higher section disposed below the shallower region in order to capture the overflow. The inner faces of the shelves are also preferably tilted forwardly in the direction of rotation in order to maintain contact with the coolant overflow.

The invention thus solves the recognized limitations of the prior design and provides an improved system for cooling the rotors of a gas turbine engine. The engine may thus be operated at or more nearly at stoichiometric combustion temperatures, thereby improving engine efficiency and specific power. In addition, by lowering the operating temperature of the rotor blades, the invention also (or alternatively) allows manufacturers to utilize less expensive material and/or materials requiring simpler manufacturing techniques in the rotor, combustor and/or compressor sections. Indeed, the use of standard alloys, which have a higher thermal conductance than many superalloys, is preferred in order to transfer more heat through the blade walls at a low temperature gradient.

BRIEF DESCRIPTION OF THE DRAWINGS

The above and further advantages of the invention may be better understood by referring to the following description in conjunction with the accompanying drawings, in which:

FIGS. 5A–5E illustrate several channel cross-sections;

FIG. 8A is a partial cross-sectional view of another embodiment of the improved evaporatively cooled rotor of the present invention;

FIG. 8B is an end view of the improved rotor of FIG. 8A along lines 8B—8B;

DESCRIPTION OF THE PREFERRED EMBODIMENT

Figure 2:
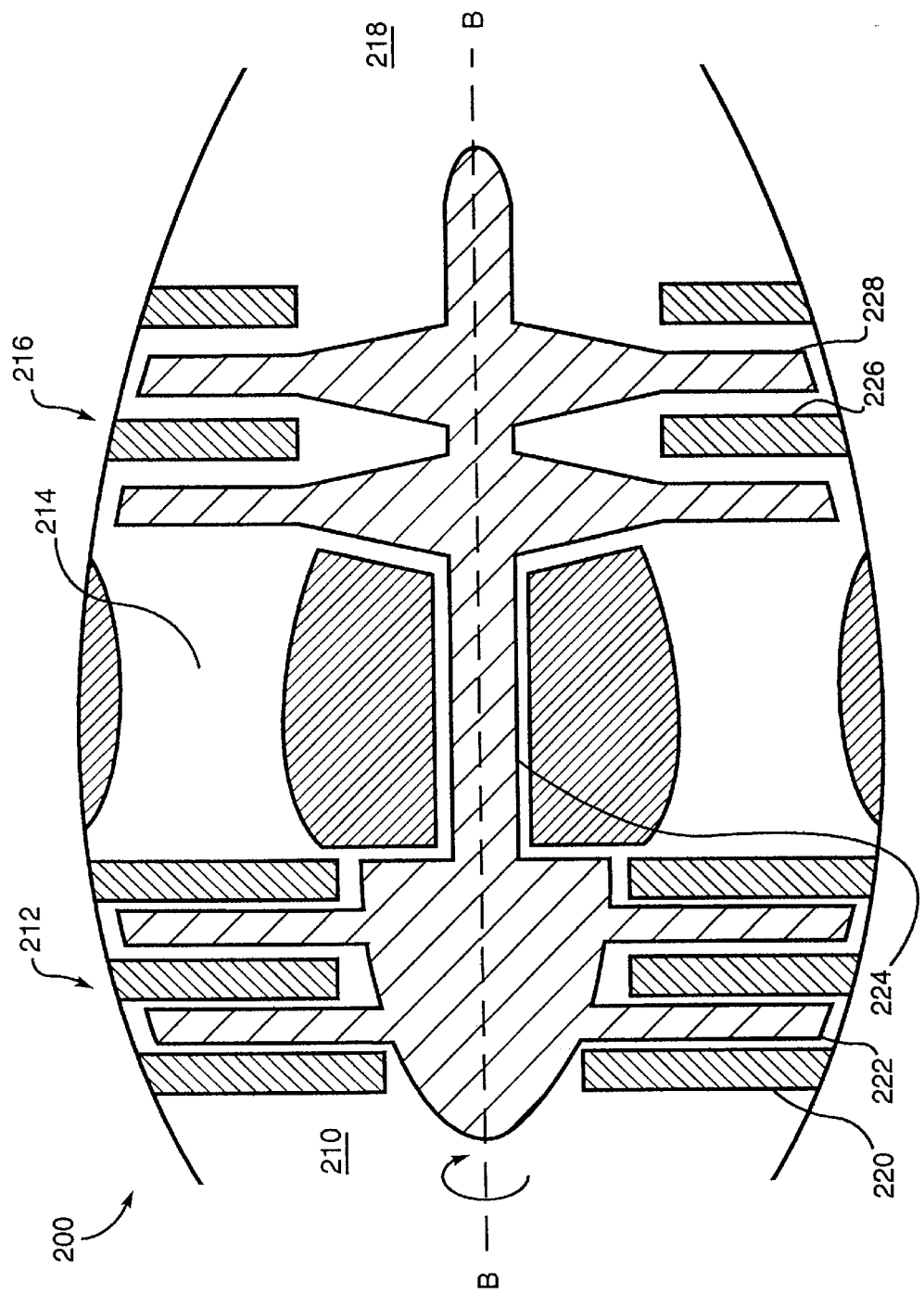
FIG. 2 is a schematic view of a gas turbine engine including the improved evaporatively cooled rotor of the present invention.

FIG. 2 is a highly schematic illustration of a gas turbine engine 200 incorporating the present invention. The gas turbine engine 200, which has a central axis of rotation B—B, includes an air intake or diffuser 210, a compressor section 212, a combustion chamber 214, a turbine section 216 and a nozzle 218. In operation, air enters the engine 200 through the intake or diffuser 210 and flows to the compressor section 212 which typically includes an alternating series of stationary blades 220 and rotating blades 222 mounted to a shaft 224 aligned with the axis B—B.

The compressed air is delivered to the combustion chamber 214 where fuel is added and the fuel/air mixture is burned. The hot gases resulting from the combustion process expand through the turbine section 216 which also includes an alternating series of stators 226 and rotors 228. The rapidly expanding hot gases perform work on the rotors 228, causing them to rotate at high speeds. The rotors 228 are mounted to the shaft 224, thereby driving the compressor section 212 of the engine 200. After passing through the turbine section 216, the hot combustion gases flow through the nozzle 218 and are discharged from the engine 200.

It should be understood that the engine 200 may further include a power turbine section for driving other elements such as a propeller, fan, electric generator, etc. Such additional components may also be driven by the turbine section 216.

Figure 3:
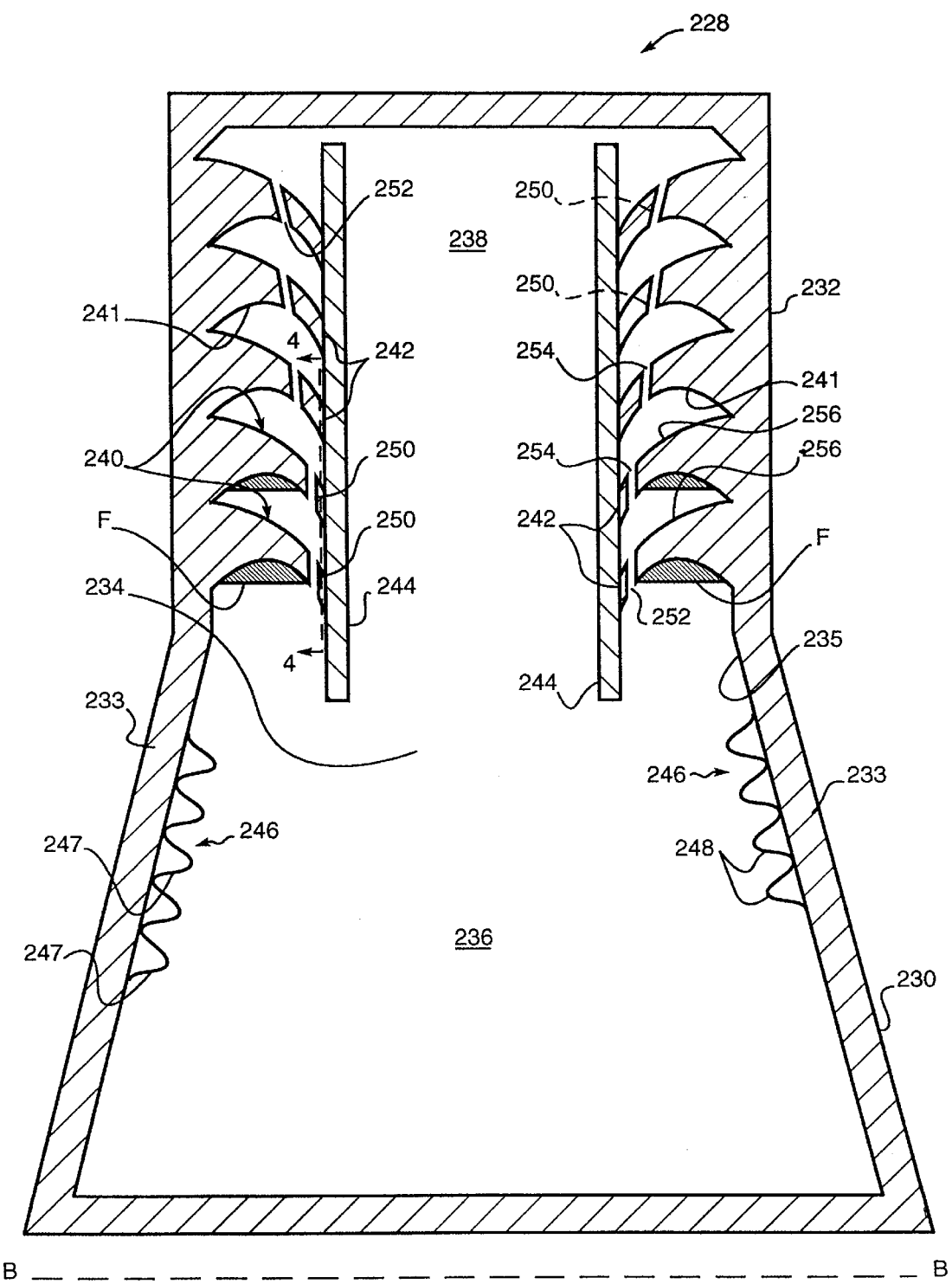
FIG. 3 is a cross-sectional view of an improved evaporatively cooled rotor in accordance with the present invention.

FIG. 3 is a cross-sectional view of an improved rotor 228 in accordance with the present invention. The rotor 228 employs an internal cooling system utilizing a closed circulation, phase transition cycle of a cooling fluid F. The rotor 228 includes a hub section 230 for supporting a blade section 232 located outwardly from the hub 230 relative to the axis of rotation B—B. The rotor 228 further includes a wall 233 having an inner surface 235. The wall 233 encloses and thereby defines an internal cavity 234 within the rotor 228. The internal cavity 234 is divided into a condensing section 236 located at the hub section 230 of the rotor 228 and. a vaporization section 238 located at the blade section 232.

Contained within the cavity 234 is a cooling fluid F for cooling the blade section 232 of the rotor 228. Heat is removed from the blade section 232 by the cooling fluid F which undergoes a phase transition from a liquid to a vapor. Various metals such as sodium or potassium or halides such as bromine or iodine are suitable for use as the cooling fluid F. Other appropriate cooling fluids will be apparent to those skilled in the art.

The rotor 228 further includes a series of capture shelves 240 radially arranged along the inner surface 235 of the rotor wall 233 in the blade section 232. Each capture shelf 240 includes a well 241 that is preferably concave in shape for receiving cooling fluid F and a lip 242 opposite the wall 233. Each capture shelf 240 preferably extends around the entire inner perimeter of the blade section 232 at a constant radius from the axis of rotation B—B. Mounted at the lip 242 of each capture shelf 240 is a baffle 244. The baffle 244, which is oriented in a generally radial direction (and is preferably porous or perforated as described below), may extend completely around the inner perimeter of the blade section 232.

It should be understood that the baffle and/or baffle supports may alternatively extend into the condensing section and be supported at a root section of the blade rather than the capture shelves. It should be further understood that the baffle may be structurally connected at the tip of the blade.

Mounted on the inner surface 235 of the wall 233 in the condensing section 236 is at least one barrier 246 which extends inwardly from the rotor wall 233 into the condensing section 236. Preferably, the barrier 246 is formed from one or more sections 247 of permeable, perforated or porous material each located at a constant radius from the axis of rotation B—B so that the barrier comprises a series of inwardly extending ridges 248. The barrier material may be bonded to the inner surface 235 of the wall 233 and may extend completely around the inner perimeter of the condenser section 230.

Figure 1:
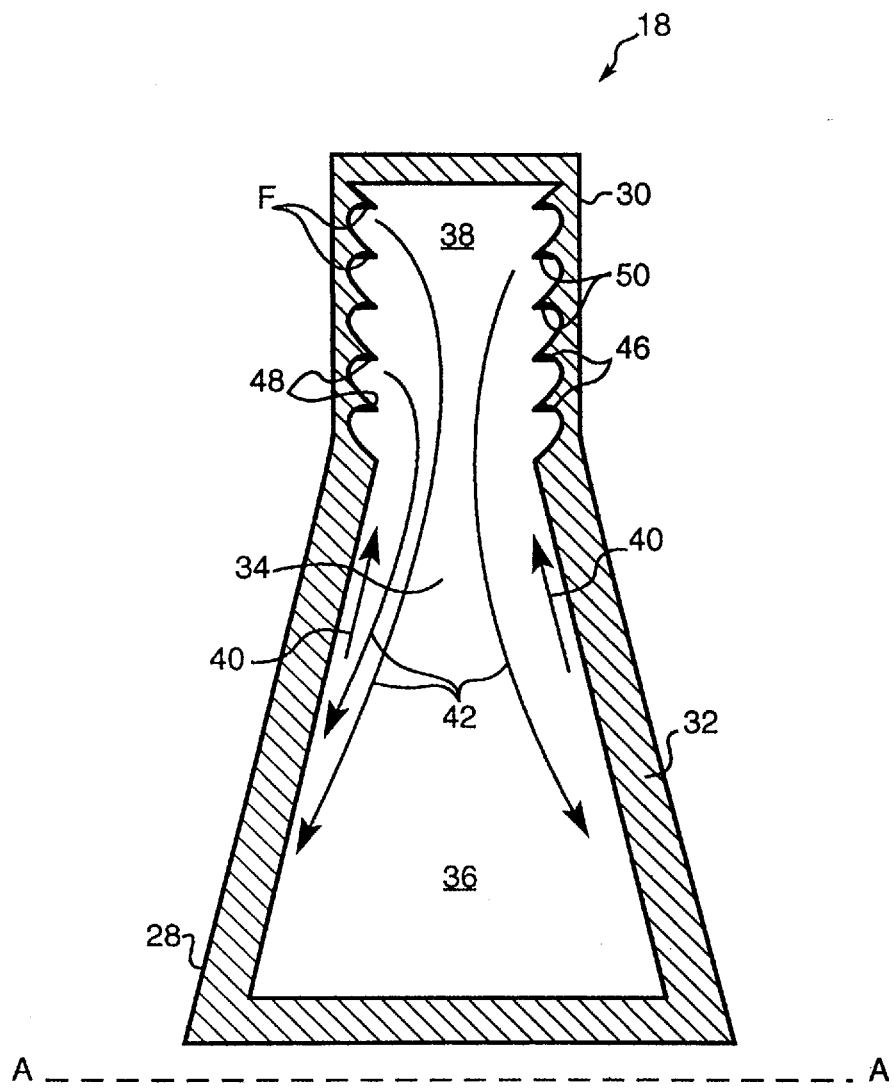
FIG. 1, discussed above, is a cross-sectional view of a prior art evaporatively cooled rotor.

During operation of the engine 200, rotation of the rotor 228 generates a centrifugal field forcing the cooling fluid F to flow from the condensing section 236 to the vaporization section 238 along the inner surface 235 of the wall 233. The cooling fluid F, however, quickly encounters the barrier 246 which essentially slows or stops the flow of fluid F temporarily at each section 247, by forcing the fluid F to pass through the section 247 or over the ridge 248. Having traveled past one section 247 of the barrier 248, the fluid F then accelerates to the next section 247 where it is again slowed or stopped. This repetitive deceleration or stopping of the fluid F as it travels along the inner surface 235 of the wall 233 toward the vaporization section 238 prevents the fluid F from realizing the high velocities experienced in the prior design. Consequently, when the fluid F reaches the first capture shelf 240, its velocity is much lower than that encountered in the rotor of FIG. 1. The banier 246 also increases the effective surface area in the condensing section 236, thereby increasing the heat flux capability for a given surface temperature.

Still referring to FIG. 3, when the fluid F reaches the first capture shelf 240, it nonetheless may still have sufficient velocity to be turned by the capture shelf 240 and expelled toward the center portion of the rotor 228. The baffle 244, however, prevents the fluid F from being lost by the first capture shelf 240 and instead re-directs the fluid F initially toward the condensing section 236 eventually forcing it to return into the well 241 of the capture shelf 240. Forced to remain in the first capture shelf 240, the fluid accumulates in a stable pool within the well 241 of the first capture shelf 240. Since the baffle 244 is preferably flush with the shelf lips 242 however, the fluid F is unable to cascade over the lip 242 and enter the subsequent shelf 240 as in the design of FIG. 1.

To permit the fluid F to flow from one shelf 240 to the next, at least one channel 250 is formed preferably through each capture shelf 240 proximate to the corresponding lip 242. Each channel 250 thus permits fluid communication between adjacent capture shelves 240. In particular, each channel 250 includes an inlet 252 preferably near the lip 242 and a discharge end 254 located in a roof section 256 of the subsequent shelf 240 such that the discharge end 254 is at a more distant radial position than the inlet 252 relative to the axis B—B. When the level of fluid F in a given shelf 240 reaches the inlet 252 of the corresponding channel 250, the fluid F enters the channel 250 and flows into the subsequent capture shelf 240 due to the centrifugal field acting on the fluid F.

It should be understood that rather than (or in addition to) extending through the lip 242 of each capture shelf 240, the channels 250 may extend through the rotor wall 233 at the back of the capture shelves 240 or as perforations in the well 241.

The channels 250 may extend substantially perpendicular to the axis of rotation B—B so that that the cooling fluid F exiting the discharge ends 254 of the channels 250 impinges the lip 242 of the subsequent shelf 240 prior to transitioning into the pool formed in the well 241 of that shelf 240. Alternatively, the channels 250 may be tilted such that the discharge end 254 of the channel 250 is located closer to the adjacent rotor wall 233 than the inlet 252. It should be understood, however, that to avoid poor distribution of the fluid F within the subsequent pool of cooling fluid F, the channels 250 should be arranged such that the cooling fluid F is neither discharged as high-velocity, concentrated streams or jets nor directed at the channels 250 which drain the subsequent pool. Instead, as illustrated below, the flow of cooling fluid F through the channels 250 is preferably designed to provide uniform distribution of the cooling fluid F in the subsequent shelf 240 and to avoid splashing of fluid directly toward the baffle 244.

Figure 4:
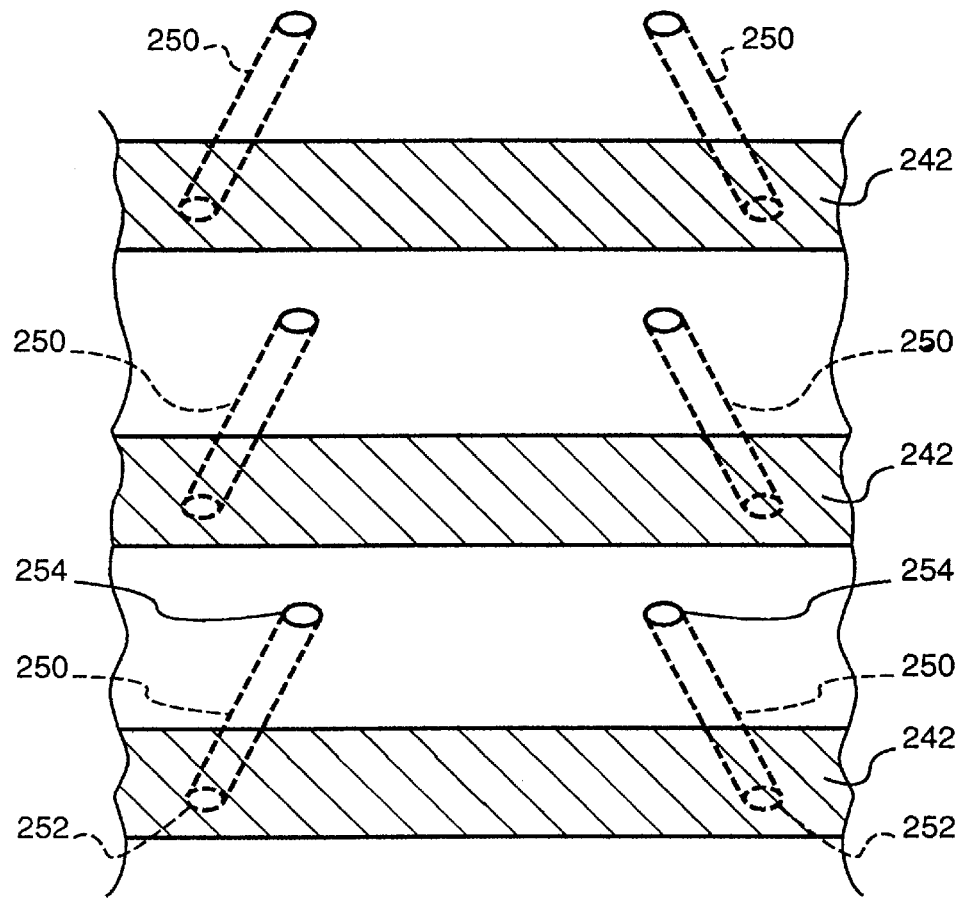
FIG. 4 is an end view of the improved rotor of FIG. 3 along lines 4—4.

As shown in FIG. 4 which is an end view of a series of capture shelves 240 of FIG. 3 along lines 4—4, each capture shelf 240 preferably includes at least one pair of channels 250 that are angled inward such that the discharge ends 254 of the two channels 250 are closer together than the inlets 252. Preferably, the channels are angled at approximately 30° relative to the direction of the centrifugal field. By forming the channels 250 at a slight incline, the cooling fluid F exiting the channels 250 stirs the cooling fluid F already deposited in the subsequent shelf 240 improving the evaporation process while avoiding the splashing discussed above.

FIGS. 5A–5E illustrate various cross-sectional geometries of the channels 250. As shown in FIG. 5A, the channels 250 may have circular cross-sections offset from the interface between the lip 242 and the baffle 244. Alternatively, the channels 250 may have rounded or square cross-sections that are flush with the baffle 244 as shown in FIGS. 5B and 5C, respectively. As shown in FIGS. 5D and 5E, respectively, the channels 250 may have a narrow slit cross-section or a shallow, rectangular cross-section both of which are again flush with the baffle 244. Other cross-sections and locations may also be used to achieve the goals of the invention.

It should be understood that the actual configuration of the channels 250, including the number of channels 250 per shelf 240 and the specific flow path, will be selected to optimize spatial distribution of cooling fluid F into each shelf 240 and to cause effective stirring of the cooling fluid F within each shelf 240. It should be further understood that the number of channels 250 and the flow path design may vary over the span of the blade section 232 to accommodate the high liquid volume flow rate within the first few shelves 240 and the lower flow rate within the last few shelves 240 due to the progressive evaporation of cooling fluid F as it travels toward the tip of the rotor 228.

Referring again to FIG. 3, the baffle 244 preferably extends radially proximate to the entire series of capture shelves 240 in order to prevent the fluid F from being expelled out of any particular capture shelf 240. Consequently, the fluid F is forced to remain within the well 241 of each subsequent capture shelf 240 where it forms a stable pool. To allow the vapor from evaporated cooling fluid F to escape the capture shelves 240 and enter the vaporization section 238, the baffle 244 is preferably porous thereby permitting the vapor to pass through the baffle 244, while retaining the liquid cooling fluid F within each of the capture shelves 240. The pressure loss across the baffle 244 is preferably minimized so that evaporated cooling fluid F may flow freely from the capture shelves 240 to the vaporization section 238. As discussed above, the differences in localized vapor pressure between the vaporization section 238 and the condensing section 236 cause the vapor to be pumped radially inward into the condensing section 236.

It should be understood that rather than being porous, the baffle 244 may incorporate other geometries or features that allow the evaporated fluid to pass therethrough while retaining the liquid fluid F in the capture shelves 240.

Figure 6C:
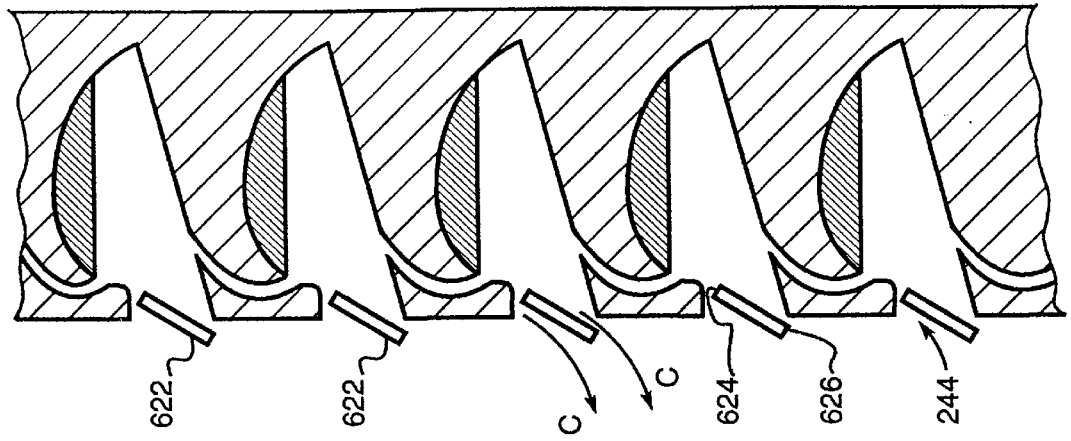
FIG. 6C is a partial cross-sectional view illustrating another aspect of the baffle of the invention.
Figure 6B:
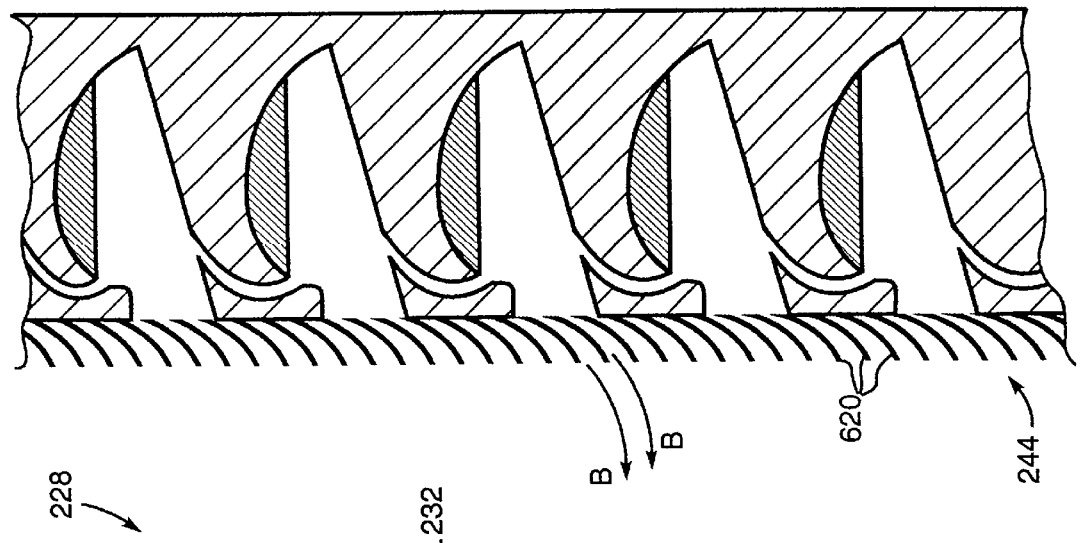
FIG. 6B is a partial cross-sectional view illustrating another aspect of the baffle of the invention.
Figure 6A:
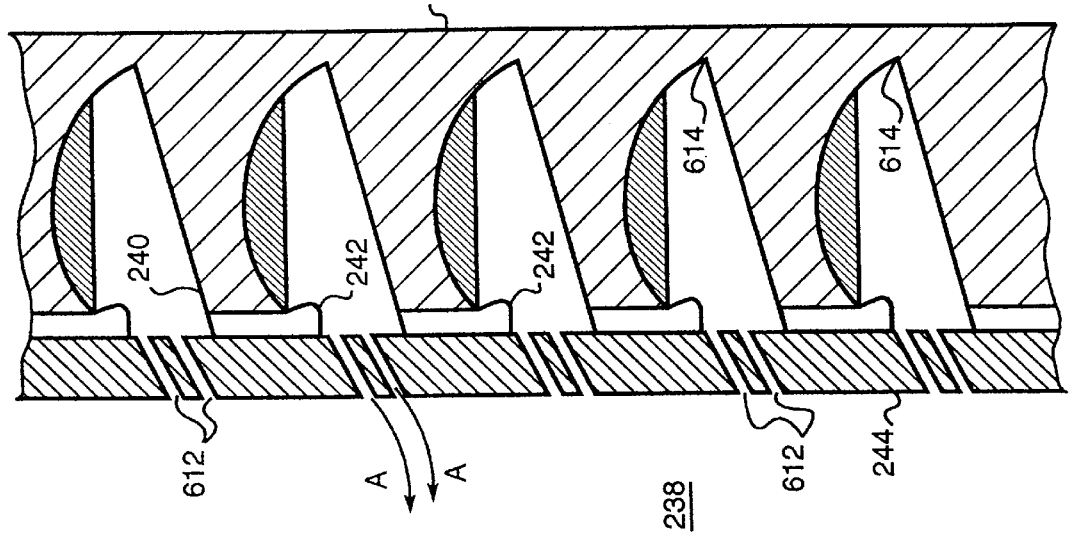
FIG. 6A is a partial cross-sectional view illustrating another aspect of the baffle of the invention.

For example, referring to FIG. 6A, the baffle 244 may include a series of perforations 612 providing vapor communication between the capture shelves 240 and the vaporization section 238 of the rotor 228. The perforations 612 are preferably small in cross-section area and oriented to prevent significant amounts of liquid cooling fluid F from passing through the baffle 544, while still allowing evaporated cooling fluid to flow through the baffle 544 as shown by arrows A. Furthermore, by supporting the baffle 244 at either the tip or the base of the rotor 228 rather than mounting the baffle 244 to the shelf lips 242, the baffle 244 may also provide added structural support to the shelves 240. Specifically, in this arrangement, the baffle 244 acts as a second support element for the otherwise cantilevered shelves 240, thereby reducing the bending load imposed at a shelf-base 614.

It should be understood that the baffle 244 may also largely fill the cavity 234 (FIG. 3), providing only sufficient space between opposing sides of the rotor 228 so as to permit the flow of the evaporated cooling fluid from the vaporization section 238 to the condensing section 236.

The baffle 244 may alternatively consist of a plurality of solid panels. For example, as shown in FIG. 6B, the baffle 244 may be formed from a series S of solid panels 620 arranged in a venetian blind configuration. The panels 620 are preferably spaced apart to permit evaporated cooling fluid to flow through the baffle 244 as shown by arrows B.

The panels 620 may be supported by radially extending ribs or frame members (not shown). FIG. 6C shows yet another arrangement in which the baffle 244 comprises a single panel 622 associated with each shelf 240. Each panel 622 preferably includes an outboard edge 624 which is located at a further radial position than an inboard edge 626 relative to the axis of rotation B—B (FIG. 3). Each panel 622, moreover, is preferably inclined such that the outboard edge 624 is closer to the wall 232 than the inboard edge 626 thereby preventing significant amounts of liquid cooling fluid F from passing through the baffle 244, while at the same time allowing evaporated cooling fluid to flow through the baffle 544 as shown by arrows C.

Figure 7:
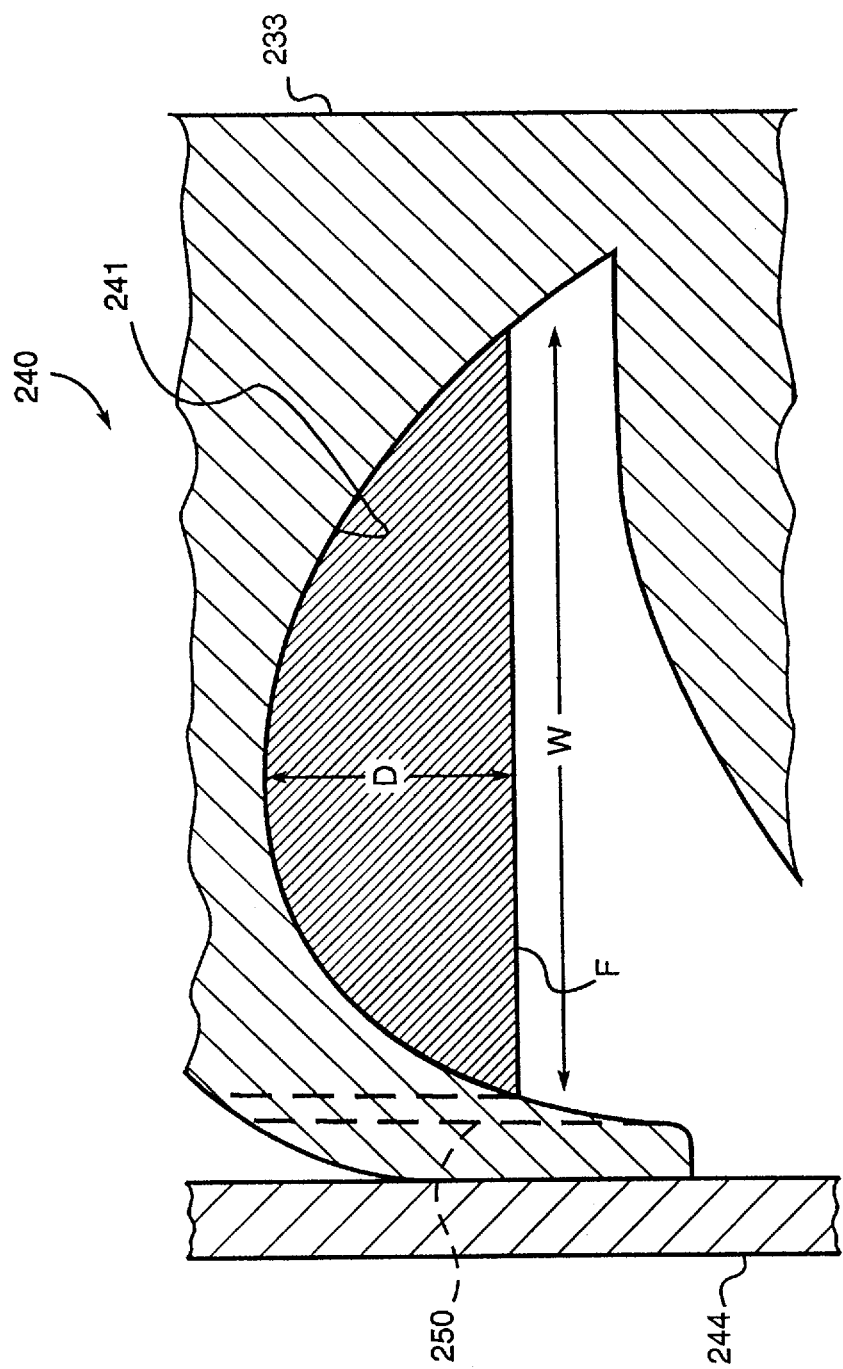
FIG. 7 is an enlarged cross-sectional view of a single capture shelf.

FIG. 7 is an enlarged view of a single capture shelf 240. The basic heat removal mechanism of the invention is evaporation of cooling fluid F preferably as surface boiling, supported by internal pool liquid convection driven by such mechanisms as differential liquid density in the acceleration field and stirring by cascading liquid flow from the preceding shelf, or nucleate boiling on at least a portion of the shelf wall defining the liquid pool of each capture shelf 240. It is preferable, however, to avoid film boiling at least as the primary mechanism of heat transfer, as it significantly increases the temperature difference between wall structure and coolant, and consequently either reduces the heat removal capabilities of the invention or increases the solid wall temperature.

To achieve these heat transfer objectives over the full operating range of both turbine heat transfer and turbine rotational speed, the well 241 of each capture shelf 240 preferably has a sufficient depth D to provide a range of coolant static pressure over that depth sufficient to force convective or nucleate boiling in the lower depth of the pool at conditions of peak blade heat flux and minimum engine shaft rotation rate, the latter resulting in minimum coolant hydrostatic pressure at depth D. Under these conditions, the shallower regions of the pool may exhibit local film boiling due to the lower static pressure, and hence lower local boiling temperature of the coolant, without adversely affecting the blade structure temperature. The cooling fluid F thus forms a relatively deep pool within each shelf 240. In addition, the well 241 preferably has a graded or sloped cross-section 241A along the rotor wall 233. The graded cross-section 241A increases the effective surface area between the pool and the rotor wall 233, thereby improving the transfer of heat from the wall 233 to the cooling fluid F. The graded cross-section 241A also ensures that heat transfer to the cooling fluid F is dominated by nucleate or pool boiling over the full thermal and dynamic operating range of the engine 200 (FIG. 2).

FIGS. 8A and 8B illustrate another embodiment of the invention. FIG. 8A is a cross-section of the blade section 232 of the rotor 228 in the vaporization section 238. Spanning opposing walls 233 of the rotor 228 are a series of radially disposed bridge structures 260. Each bridge structure 260 includes an inward face 262 relative to the axis of rotation B—B and two ends 264. The bridge structures 260 are preferably arched inwardly such that a center point C of each bridge structure 260 is closer to the axis of rotation B—B than the corresponding ends 264 of the bridge structure 260.

Formed along the inward face 262 of each bridge structure 260 is a capture groove 266. Referring to FIG. 8B, which is an end view of the rotor 228 of FIG. 8A along lines 8B—8B, the capture grooves 266 are preferably concavely shaped thereby defining a well 268 and a pair of edges 270 along each groove 266. The rotor 228 preferably includes a plurality of bridge structures 260 formed into rows 272a–c at each designated spanwise location. Furthermore, the adjacent rows 272a to 272b, 272b to 272c, etc. are preferably offset from one another such that the edges 270 of the first row 272a overlie the wells 268 of the subsequent row 272b.

In operation, cooling fluid F flows along the inner wall 235 of the rotor 228 toward the bridge structures 260 in the vaporization section 238. The cooling fluid enters the capture groove 266 of the first row 272a of bridge structures 260. Cooling fluid F continues to build-up within the capture groove 266 until the level of cooling fluid F reaches the edges 270 of the groove 266 at the interface with the inner surface 235 of the rotor wall 233. The cooling fluid F then cascades over the edges 270 of the grooves 266 under the centrifugal field as shown by arrows 274. Because the subsequent row 272b of bridge structures 260 is arranged so that the wells 268 underlie the edges 270 of the first row 272a, the cascading fluid F is caught in the capture grooves 266 of the second row 272b of bridge structures 260. Thus, the cooling fluid F flows from one row 272a of bridge structures 260 to the next. The bridge structures 260 within each row, moreover, are preferably arranged in sufficient proximity to one another so that cooling fluid F, splashing from the capture groove 266 or well 268 of one bridge structure 260, if not caught within the capture grooves 266 of the subsequent row, is interrupted by an adjacent bridge structure 260.

In addition to cascading from one row 272a to the next row 272b, a portion of cooling fluid F also evaporates from each row 272a of bridge structures 260. Since the bridge structures 260 are arched inwardly, the cooling fluid F collects in that portion of the grooves 266 adjacent to the rotor wall 233. The evaporation of cooling fluid F adjacent to the rotor wall 233 cools that portion of the rotor wall 233. As discussed above, due to the increased vapor pressure within the vaporization section 238, evaporated cooling fluid is pumped radially inward into the condensing section where it transitions back to a liquid and is available to start the cooling process all over again.

In addition to cooling the rotor 228, the bridge structures 260 which extend circumferentially across the cavity 234 add structural integrity to the rotor 228 in the vaporization section 238.

It should be understood that the bridge structures 260 may also be disposed in the condensing section 236 of the rotor to improve the condensation of evaporated cooling fluid F and to control its outward flow velocity in the same general manner as described above with reference to the sequential barriers 248 (FIG. 3).

Figure 9A:
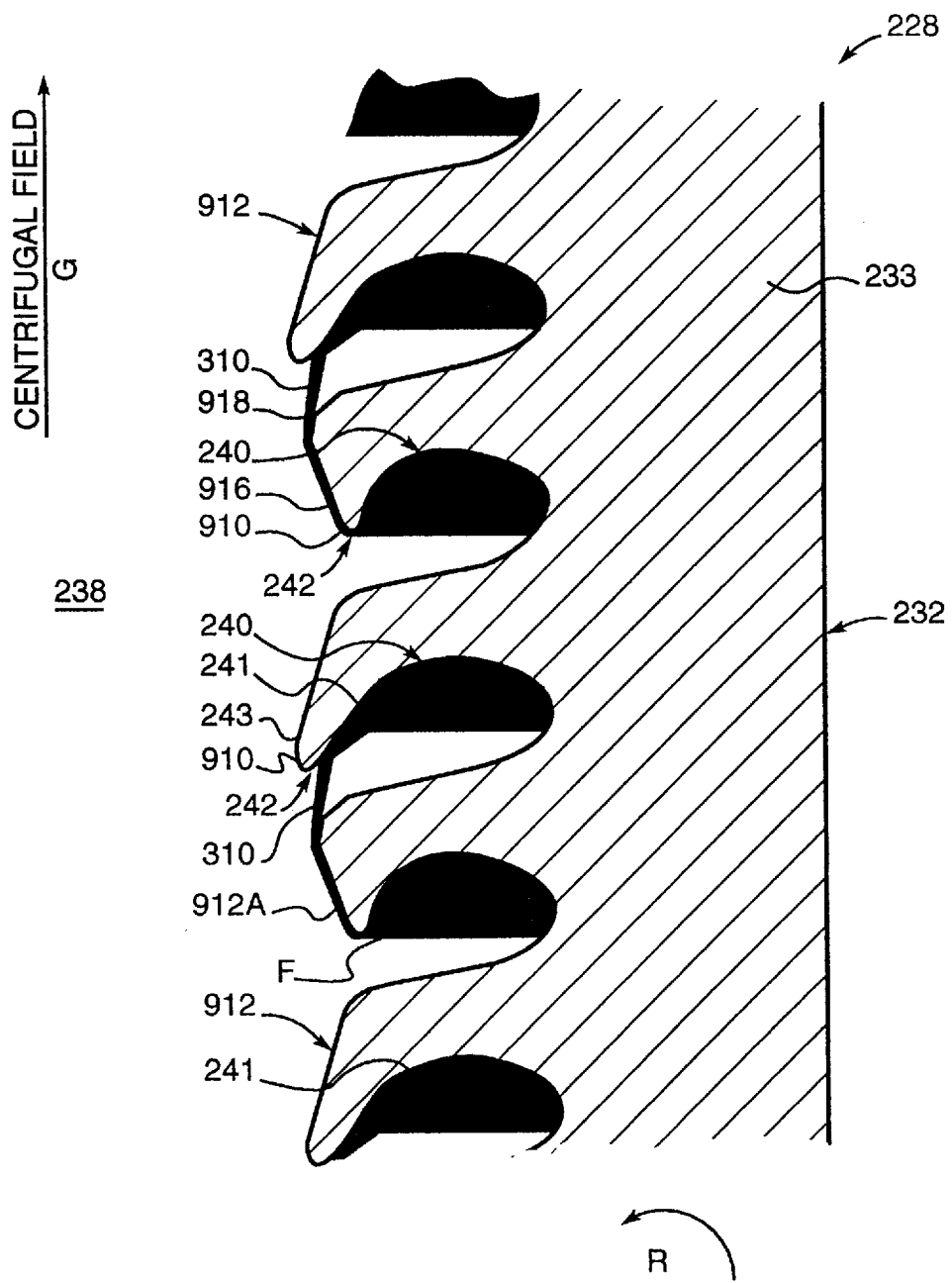
FIG. 9A is a partial cross-sectional view of another embodiment of the improved evaporatively cooled rotor of the present invention.
Figure 9B:
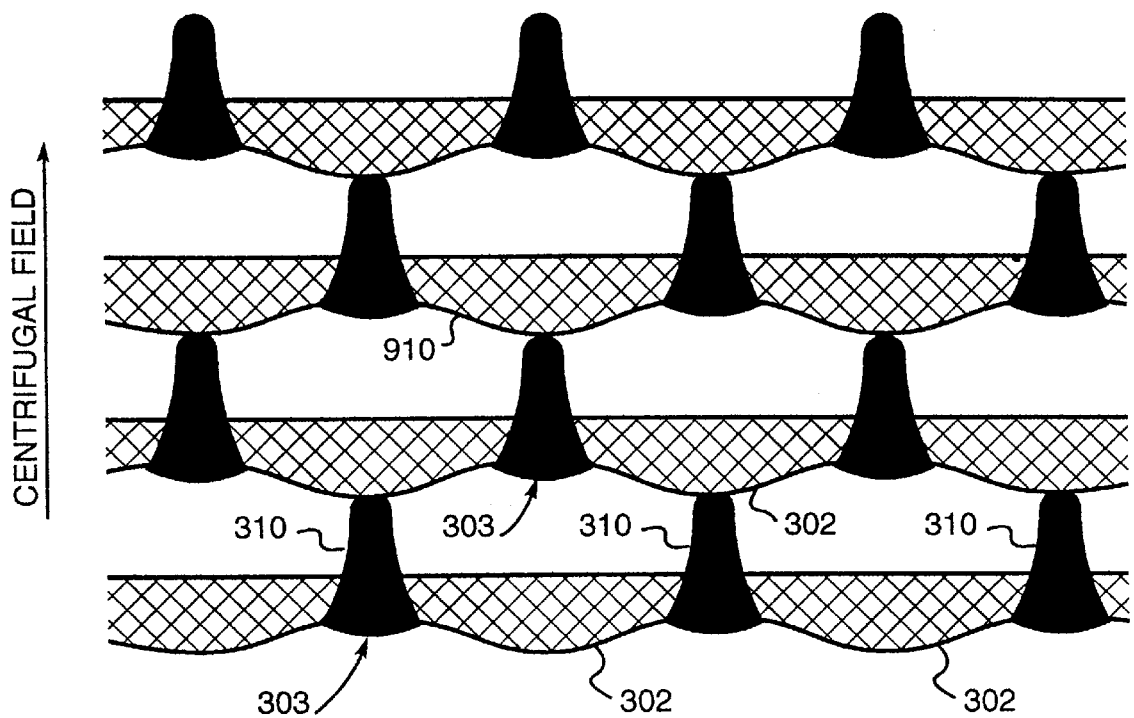
FIG. 9B is an end view of the improved rotor of FIG. 9A.

FIGS. 9A and 9B illustrate another embodiment of the invention. FIG. 9A is a partial cross-section of a blade section 232 of a rotor 228 in a vaporization section 238. An array of capture shelves 240 having a contoured edge 910 are formed in a wall 233 of the rotor 228. Each shelf 240 further includes a well 241. FIG. 9B is an end view of the contoured edge 910 of the capture shelves 240 of FIG. 9A. Specifically, each shelf lip 242 defines a contoured edge 910 opposite the blade wall 233. As shown in FIG. 9B, the contoured edge 910 preferably includes alternating higher sections 302 and lower sections 303.

In operation, cooling fluid F fills the first capture shelf 240 as described above. The fluid F then cascades over the lip 242 of the first shelf 240 at its lowest point, i.e., lower sections 303. Each lower section 303 thus provides an over flow path 310 for the cooling fluid F as it cascades to the subsequent shelves 240. Each higher section 302 of the subsequent shelf 240, moreover, is preferably located below a corresponding lower section 303 of the preceding shelf 300 as best shown in FIG. 9B. In addition, the higher sections 302 preferably project inwardly opposite the rotor wall 233 beyond the lower sections 303 to improve the capture of cascading cooling fluid F. Consequently, the cooling fluid F, as it cascades between capture shelves 240 via overflow paths 310, is directed by the higher sections 302 of the subsequent shelf 240 into the well 241 of that shelf 240 where it forms a stable pool.

To provide for a stable flow of cooling fluid F between adjacent capture shelves 240 over a wide range of operating conditions, the lower sections 303 of the lip 242 are preferably formed with a V-shaped cross-section. Alternatively, the lower sections 303 of a given capture shelf 240 rather than having a uniform or constant depth, may vary over two or more depths, thereby providing controlled overflow at both low and high liquid volume flow rates.

Referring again to FIG. 9A, each shelf lip 242 further includes a shelf face 912 opposite the wall 233. The radial or spanwise orientation of the shelf face 912, moreover, is preferably selected so as to improve the flowrate of cooling liquid F between the capture shelves 240. Specifically, a first face portion 912A associated with each lower section 303 is preferably angled forwardly relative to the direction of rotation R. That is, an inboard segment 916 of the first face portion 912A relative to the centrifugal acceleration field G is closer to the rotor wall 233 than an outboard section 918. By providing each first face portion 912A with a forward angle, the cooling fluid F is maintained in contact with face portion 912A, improving the acceleration efficiency of the cooling fluid F and providing flow control over the cooling fluid F as it enters the subsequent capture shelf 240. The orientation of the shelf faces 912 is also preferably chosen to compensate for differential coriolis accelerations on the blade walls 233.

It should be understood that the embodiment of the invention as shown in FIGS. 9A and 9B may also include the barrier and baffle elements described above.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. An evaporatively cooled rotor adapted for rotation about an axis and having an internal cavity defining an inner surface and including a vaporization section disposed radially outwardly with respect to the rotational axis from a condensing section, the rotor further comprising:
   at least one capture means in the vaporization section disposed at a substantially constant radius from the rotational axis for capturing cooling fluid contained within the internal cavity and flowing radially outwardly in a centrifugal field generated during rotation of the rotor, the capture means restricting the flow of cooling fluid to distribute cooling fluid over the inner surface of the rotor in the vaporization section; and
   means for decelerating fluid flow in the condensing section projecting outwardly from the inner surface of the rotor.

2. The evaporatively cooled rotor of claim 1 wherein the decelerating means comprises at least one barrier located on the inner surface of the rotor across the flow of the fluid.

3. The evaporatively cooled rotor of claim 1 wherein the capture means further comprises:
   a radial array of capture shelves, each of the shelves including a lip disposed at a substantially constant radius from the rotational axis and a well portion adjacent to the lip for capturing the flowing cooling fluid.

4. The evaporatively cooled rotor of claim 1 wherein the decelerating means comprises a plurality of barriers in the condensing section, each barrier disposed at a substantially fixed radius from the rotational axis.

5. The evaporatively cooled rotor of claim 4 wherein each barrier extends completely around the perimeter of the inner cavity.

6. The evaporatively cooled rotor of claim 2 wherein the barrier is ripple-shaped and includes a plurality of ridges for temporarily slowing or stopping the flow of cooling fluid as the cooling fluid flows from the condensing section to the vaporization section of the rotor.

7. The evaporatively cooled rotor of claim 6 wherein the barrier is formed from a fine mesh screen.

8. The evaporatively cooled rotor of claim 6 wherein the barrier is formed from a perforate material.

9. The evaporatively cooled rotor of claim 6 wherein the barrier is formed from a porous material.

10. An evaporatively cooled rotor adapted for rotation about an axis and having an internal cavity defining an inner surface and including a vaporization section disposed radially outwardly with respect to the rotational axis from a condensing section, the rotor further comprising:
    a radial array of capture shelves located in the vaporization section, each capture shelf having a lip disposed at a substantially constant radius from the rotational axis and well adjacent to the lip for capturing cooling fluid contained within the internal cavity and flowing radially outwardly in a centrifugal field generated during rotation of the rotor, the capture shelves restricting the flow of cooling fluid to distribute cooling fluid over the inner surface of the rotor in the vaporization section;
    a radially extending baffle proximate to the lip of each capture shelf, the baffle extending circumferentially so as to prevent a radially flowing cooling fluid from being expelled from the capture shelf; and
    means for providing fluid communication between adjacent shelves in the radial array.

11. The evaporatively cooled rotor of claim 10 wherein the fluid communication means comprises at least one channel extending in a substantially radial direction between adjacent capture shelves.

12. The evaporatively cooled rotor of claim 10 wherein the baffle is perforated such that the baffle retains the cooling fluid within the well of each capture shelf and permits vapor from evaporated cooling fluid to pass through the baffle.

13. The evaporatively cooled rotor of claim 10 wherein the baffle is porous such that the baffle retains the cooling fluid within the well of each capture shelf and permits vapor from evaporated cooling fluid to pass through the baffle.

14. The evaporatively cooled rotor of claim 11 wherein said at least one channel has a circular cross-section offset from the baffle.

15. The evaporatively cooled rotor of claim 11 wherein said at least one channel has a rounded cross-section flush with the baffle.

16. The evaporatively cooled rotor of claim 11 wherein said at least one channel has a square cross-section flush with the baffle.

17. The evaporatively cooled rotor of claim 11 wherein said at least one channel has a narrow slit cross-section flush with the baffle.

18. The evaporatively cooled rotor of claim 11 wherein said at least one channel has a shallow, rectangular cross-section flush with the baffle.

19. The evaporatively cooled rotor of claim 11 wherein said at least one channel extends in a substantially radial direction such that the cooling fluid exiting said at least one channel impinges the lip of the subsequent capture shelf in the radial array.

20. The evaporatively cooled rotor of claim 11 wherein said at least one channel includes an inlet located on the lip of the corresponding capture shelf and a discharge end located above the well of the subsequent capture shelf in the radial array and said at least one channel is tilted such that the discharge end of the channel is further displaced circumferentially from the baffle than the corresponding inlet.

21. The evaporatively cooled rotor of claim 10 wherein at least one capture shelf includes a pair of channels extending through the lip of said at least one capture shelf, each channel having an inlet located on the lip of said at least one capture shelf and a discharge end located above the well of the subsequent capture shelf in the radial array,
    each channel oppositely inclined such that the discharge ends of the two channels are closer together than the corresponding inlets of the two channels.

22. The evaporatively cooled rotor of claim 21 wherein the cooling fluid upon exiting the discharge ends of the pair of channels stirs the cooling fluid within the subsequent capture shelf.

23. The evaporatively cooled rotor of claim 10 wherein the baffle comprises a plurality of radially spaced panels.

24. The evaporatively cooled rotor of claim 23 wherein the panels are oriented and spaced to permit vapor from evaporated cooling fluid to flow through the baffle.

25. The evaporatively cooled rotor of claim 10 wherein the baffle comprises a panel associated with each capture shelf.

26. The evaporatively cooled rotor of claim 25 wherein each panel is oriented to permit vapor from evaporated cooling fluid to flow past the panel.

27. An evaporatively cooled rotor adapted for rotation about an axis and having an internal cavity including a vaporization section disposed radially outwardly with respect to the rotational axis from a condensing section, the rotor further comprising:
    a radial array of capture shelves located in the vaporization section, each capture shelf having a lip disposed at a substantially constant radius from the rotational axis and a well adjacent to the lip for capturing cooling fluid;
    a radially extending baffle proximate to the lip of each capture shelf, such that the baffle prevents the flow of cooling fluid from being expelled from the capture shelf;

at least one channel extending in a substantially radial direction through each capture shelf to permit fluid communication between adjacent capture shelves in the radial array; and at least one barrier located on the inner surface of the rotor in the condensing section across the flowpath of the fluid.

28. An evaporatively cooled rotor adapted for rotation about an axis and having a rotor wall defining an internal cavity including a vaporization section disposed radially outwardly with respect to the rotational axis from a condensing section, the rotor further comprising:

a radial array of capture shelves located along the rotor wall in the vaporization section, each capture shelf having a lip disposed at a substantially constant radius from the rotational axis and a well adjacent to the lip for capturing cooling fluid;

wherein the well of at least one capture shelf has a graded slope adjacent to the rotor wall the graded slope being inclined inwardly away from the condensing section.

* * * * *